(12) United States Patent
Hentz et al.

(10) Patent No.: US 7,030,753 B2
(45) Date of Patent: Apr. 18, 2006

(54) INFORMATION AND SECURITY AUDIO AND VIDEO TRANSMISSION RECEPTION SYSTEM

(76) Inventors: Charles L. Hentz, 2600 Wabash Ave., Northfield, NJ (US) 08225; Stavros Antonakakis, 169 William Feather Dr., Kirkwood, NJ (US) 08043

( * ) Notice: Subject to any disclaimer, the term of this patent is extended or adjusted under 35 U.S.C. 154(b) by 0 days.

(21) Appl. No.: 10/972,698

(22) Filed: Oct. 25, 2004

(65) Prior Publication Data

US 2005/0091110 A1   Apr. 28, 2005

Related U.S. Application Data

(60) Provisional application No. 60/514,384, filed on Oct. 24, 2003.

(51) Int. Cl.
G08B 1/00 (2006.01)
H04N 7/18 (2006.01)

(52) U.S. Cl. .................. 340/531; 340/541; 340/815.4; 348/151; 725/23; 725/33; 725/135

(58) Field of Classification Search ............. 340/815.4, 340/425.5, 905; 348/143, 151; 705/14; 725/23, 33
See application file for complete search history.

(56) References Cited

U.S. PATENT DOCUMENTS

| | | | |
|---|---|---|---|
| 5,260,778 A * | 11/1993 | Kauffman et al. ............. 725/33 |
| 6,559,769 B1 * | 5/2003 | Anthony et al. ............. 340/574 |
| 6,615,186 B1 | 9/2003 | Kolls |
| 6,618,074 B1 * | 9/2003 | Seeley et al. ................ 348/143 |
| 6,731,198 B1 | 5/2004 | Stobbe et al. |
| 6,738,087 B1 | 5/2004 | Belkin et al. |
| 6,742,116 B1 | 5/2004 | Matsui et al. |
| 6,745,231 B1 | 6/2004 | Megiddo |
| 6,754,481 B1 | 6/2004 | Nilsson |
| 6,756,899 B1 | 6/2004 | Kobayashi et al. |
| 6,762,788 B1 | 7/2004 | Chang |
| 6,778,084 B1 | 8/2004 | Chang et al. |
| 6,778,085 B1 | 8/2004 | Faulkner et al. |
| 6,807,168 B1 | 10/2004 | Daly et al. |
| 6,812,851 B1 * | 11/2004 | Dukach et al. ........... 340/815.4 |
| 6,850,209 B1 * | 2/2005 | Mankins et al. ............. 345/1.3 |
| 6,951,030 B1 * | 9/2005 | Hirai et al. .................... 725/33 |
| 2002/0077889 A1 * | 6/2002 | Kolls .......................... 705/14 |
| 2002/0108125 A1 * | 8/2002 | Joao ........................... 725/139 |
| 2002/0164962 A1 * | 11/2002 | Mankins et al. .............. 455/99 |
| 2003/0234725 A1 * | 12/2003 | Lemelson et al. .......... 340/521 |

* cited by examiner

*Primary Examiner*—Jeffery Hofsass
*Assistant Examiner*—Anne V. Lai
(74) *Attorney, Agent, or Firm*—Robert A. Koons, Jr.; Matthew P. McWilliams; Drinker Biddle & Reath LLP

(57) ABSTRACT

Disclosed is a transmission and reception system for security and information exchange. The system allows audio, video, and other types of monitoring of a location and the presentation of various services and forms of information to people at the location.

10 Claims, 2 Drawing Sheets

INFORMATION AND SECURITY AUDIO AND VIDEO TRANSMISSION RECEPTION SYSTEM

REFERENCE TO RELATED APPLICATIONS

This application claims priority to provisional patent application Ser. No. 60/514,384, which was filed on Oct. 24, 2003.

FIELD OF THE INVENTION

The present invention is in the field of surveillance and information exchange. More specifically, the present invention relates to a remote system for surveillance of a public place or transportation system with the capability of simultaneously transmitting information to the public place or transportation system.

BACKGROUND OF THE INVENTION

It is generally believed that there exists a need for some degree of remote monitoring of locations. In particular, this belief has become stronger following the events of Sep. 11, 2001 in the United States. In addition, there is a general utility in, and a need for, a system which enables real-time, delayed, or pre-recorded information to be exchanged between remote locations. Systems exist which address some of these needs, such as audio/visual monitoring of public places for security reasons, but otherwise do not simultaneously provide additional services, such as public communication with the internet. There is therefore a need for a very general and flexible transmission and reception system for security and information exchange.

BRIEF DESCRIPTION OF THE INVENTION

The present invention comprises providing multiple remote electronic audio, and video, real time or recorded transmitting and receiving stations, portable or stationary, located in public places, for surveillance observation and information gathering, and the simultaneous dissemination of public service and consumer information. The invention further involves the utilization of multiple remote systems controlled from a central headquarters via either satellite, wireless, or hard wire signals. These systems are comprised of multiple components that are capable of transmitting and receiving information pertaining to, for example, security, geographical position, communications, and dissemination of commercial marketing and financial information, both real time and pre-recorded. The system may also provide a two-way multi-media environment within, for example, a transportation vehicle, providing public access to, for example, wireless internet, Automatic Teller Machines (ATMs), the Global Positioning System, cellular phone communication, and routing of information.

DETAILED DESCRIPTION OF THE INVENTION

Figure 1:
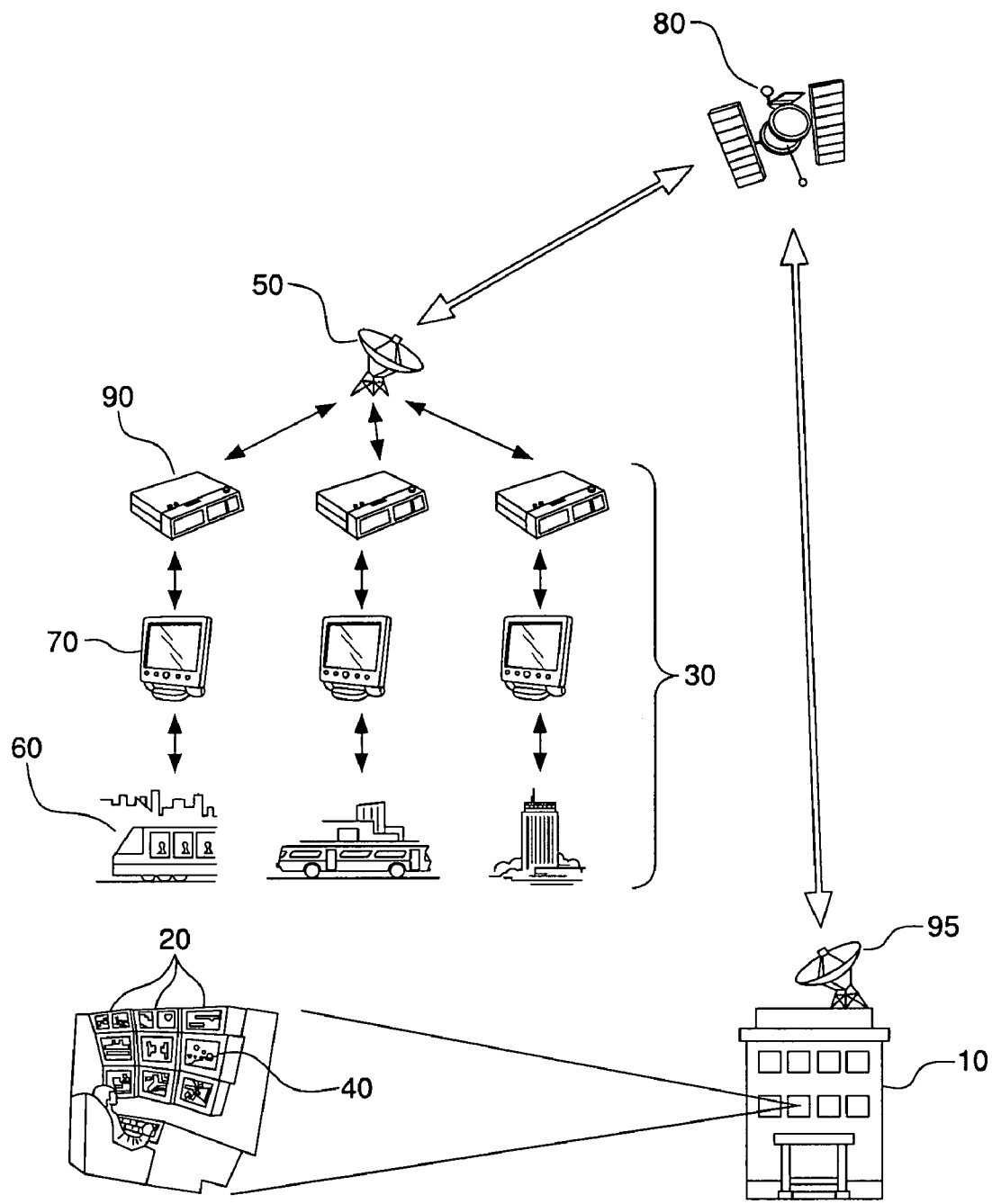
FIG. 1 shows one specific embodiment of a two-way information exchange system.

Following is a detailed description of one embodiment of the present invention and this embodiment's various components. This description is not to be construed as limiting.

1. Headquarters

The system comprises a central headquarters 10 wherein are located banks 20 of television audio and video monitors or receivers 40 capable of receiving audio and video television transmissions from multiple remote units 30 simultaneously. These receivers 40 may be capable of split screen viewing, and may be programmed for multiple camera viewing by scrolling between images transmitted from one camera to those transmitted from other cameras, these cameras being located at the remote units 30. These images may be viewed either in real time or recorded and viewed later. The headquarters 10 will have television cameras, transmitters, and information storage media capable of transmitting real time audio-visual information or pre-recorded programming to each remote unit 30 either individually or collectively and presented at each unit 30. Examples of such audio/video information include entertainment, commercial programming, news and weather, public service announcements and emergency information and instructions.

Also installed in the headquarters 10 may be computer systems that respond in various ways to signals received at one or more remote units 30 from people or objects. Examples of such responses include connecting users to the internet; authorizing bank transactions, including those from an Automatic Teller Machine (ATM); verifying the position of a vehicle determined by a system such as the Global Positioning System (GPS) and routing phone calls to both land-phone and cellular-phone users.

2. Remote Unit

Figure 2:
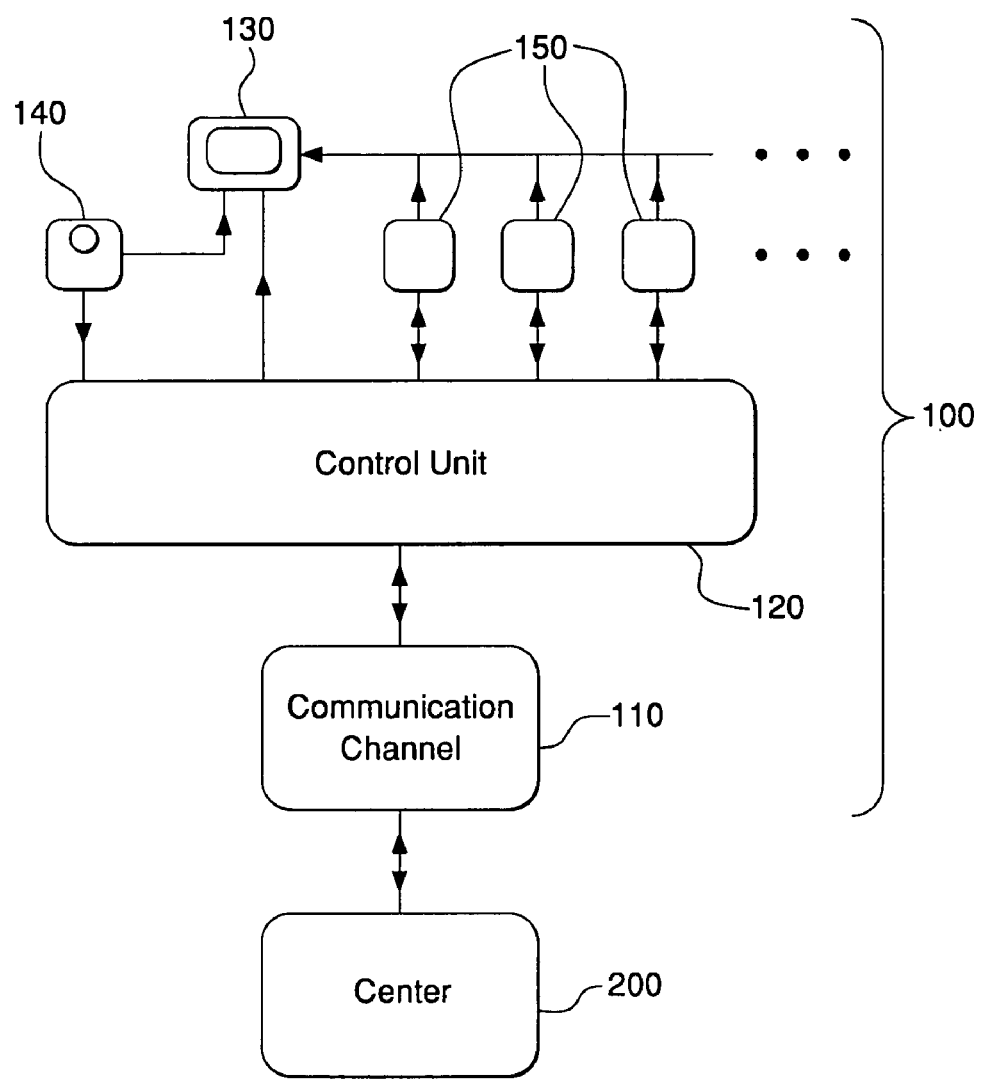
FIG. 2 shows one specific embodiment of one remote unit, communication channel, and center.

Referring to FIG. 2, the remote unit 100 is comprised of a satellite receiver transmitter (communication channel) 110 in two-way communication with a satellite, a control unit 120 to operate the system and implement communication with a center (headquarters) 200, a presentation device 130, such as a television monitor, for presenting audio/video information received from headquarters or produced locally, and a detector, such as an audio and video recording and transmitting camera 140 for gathering surveillance information to be transmitted to the center 200. Other components 150 may include a Global Positioning Sender and receiver, components capable of communicating with internet providers, mobile telephone providers, ATM units, and others.

As an alternative or as compliment to satellite communication, communication within the entire system of the invention and between the system and the external world can be done through hard wiring via catenaries (e.g. the hanging wires providing electrical power to moving vehicles), train rails, or other wired methods as individual installation applications dictate.

Referring to FIG. 2, an example illustrating the two-way flow of information between a remote unit 100 and a center (headquarters) 200 begins with a real-time moving image detected by the camera 140 located, for example, in a train car. The image is transmitted through the control unit 120 to the satellite transceiver (communication channel) 110 and then to a satellite. The satellite relays the image to another transceiver at the headquarters 200. The image may then be viewed by a human viewer on a video monitor in the headquarters 200.

Information originating at the headquarters 200 can be transmitted to monitor 130 located in the train car along a path which is the reverse of the path described in the previous paragraph. This information would be viewed by passengers in the train car. Examples of information which could be so transmitted include product advertising, public service information, or emergency instructions.

In alternative embodiments, the camera 140 could be located in any public or private place or transportation modality, such as a concourse, tunnel, building, railway right-of-way, railway tracks, buses, subways, trolleys or taxis.

In enclosed locations, such as tunnels, without line-of-sight communication to a satellite, the communications link could be established using two-way antennas installed outside of the enclosed location. These antennas could then be hard-wired to other two-way antennas inside the enclosed location, completing a communication link to the remote unit 100. Similarly, as a particular example, repeater satellite dishes may be installed at rail yards, bus garages, catenaries towers, train and rail stations and platforms as signal transmitting and receiving strength requires, or any location where units are installed. Alternatively, an antenna could be positioned at the mouth of the tunnel with at least a portion of the tunnel interior being within the transmitting and receiving beam widths of the antenna.

3. Additional Features

In addition to the features recited above, any embodiment of the invention may include any one or combinations of the following features.

A. The system may provide for the satellite or wired receiver to receive or transmit data in compressed or non compressed form.
B. The system may include complimentary capability to transmit data to the control unit by hard wire or wireless signal.
C. The control unit may record, compress, or uncompress the information as directed from the remote unit or the headquarters.
D. Referring to FIG. 2, the control unit 120 may turn on a viewing monitor 130, or a security audio and video camera 140 as directed from the control unit 120 or the headquarters 200. The control unit may direct, record, or transmit information received via on board audio and video recording camera 140 to headquarters 200 or retain the information in memory for later dissemination as directed.
E. The control unit 120 may transmit live or pre-recorded programming through the monitor 130 as predetermined by headquarters 200, and override prerecorded programming for real time transmissions as directed electronically.
F. The control unit 120 may be capable of communicating with other units when electronic signals are received from headquarters 200 to simultaneously control signals to any place, such as passenger-carrying railroad car, passenger bus, passenger Light Rail Car, Railroad Stations, platforms, Automatic Teller Machines, or any area or location where units are installed where the beaming of television and camera audio and video is required for security, observation, information gathering and dissemination, or for access to internet providers, mobile communications providers, financial institutions, and GPS location information.
G. In any embodiment, diagnostic information could be transmitted over the two-way communication link to aid in troubleshooting.

The system and units may have dual capabilities for both homeland security and dissemination of commercial and financial information and communications. Financing construction and installation can be provided by government grants for homeland security applications, or by selling services enabled by the unit. Once installed, the unit could continue to generate revenue from the same sales of service. As one example, access to the television screens 130 for presentation of advertisements could be sold. As another example, access to the Internet or to a cellular telephone network could be offered for sale, making use of the two-way communication provided by the unit.

4. System Requirements for a Preferred Embodiment

A preferred embodiment of the invention may include the following components now existing on the market:

A. Plasma Flat Screen Television as a video monitors 130.
B. A mini Camera, with video/Audio reception and transmission capabilities as remote unit camera 140.
C. A cable signal control box, hard drive, and motherboard programmed for video surveillance, file compression and expansion, and audio and video programming.
D. Satellite sending and receiving dish for two-way conveyance of information. Alternatively, the wires supplying power to the train ("catenary wires") or the rails could be used as the information conduit.
E. Batteries, and Battery Charger
F. Transformer
G. Camera Signal Receiver and Sender.
H. Security Cabinet (portable, with external power and data connectors)
I. Computer Memory Unit.
J. Transmission and Reception Signal Splitters.
K. ATM unit.
L. GPS unit with data feed to computer.
M. Wireless internet access point tied into computer.
N. Cellular signal converter/sender/receiver.
O. "Hard wired" telephone or payphone unit.

In this embodiment, each remote unit will be powered by available power supplies but converted by unit transformers to system voltage and wattage requirements. Preferably, all units will operate on the same pre determined universal voltage and wattage requirement.

The entire unit may have an on board battery backup system operating in a continuous charging mode. This battery backup may be capable of continuous television reception and broadcasting, in conjunction with camera audio and video outgoing transmissions for a period of at least eight (8) hours if the primary source of power is lost. A secondary power backup will be capable of continued surveillance camera audio and video outgoing transmissions for at least an additional eight (8) hours.

5. Operating Description for a Preferred Embodiment Single Unit Installation and Operation A preferred embodiment utilizing one (1) passenger rail car will now be described by reference to FIG. 1. It will be recognized by those of skill in the art that the description of this embodiment with reference to a rail car is non-limiting. Similar installations can be accomplished at any public place or transportation modality.

As part of a communication channel a satellite dish antenna 50 may be installed on the roof of a designated rail car 60, and receive its power from either or both the electrical system of the vehicle or the battery backup system located in the roof or wall of the car.

A Flat Screen Plasma High Definition Television 70 (some of which are only 3" deep); with a hidden mini-camera with audio pickup located in the television case is installed on the wall at each end of the Rail Car facing into the car.

Additional components included in the car 60 and connected into the system may include a wireless access point allowing users to log onto the wireless internet, an ATM machine secured to the interior of the car via tamperproof devices, a cellular and pay phone type transceiver communicating with headquarters 10 via satellite 80 or other above mentioned means, and a self contained, tamper-proof, removable Central Processing Unit (CPU) with battery back up power supply and self backing up data management that is capable of interacting with all above technologies and able to encrypt all above transmissions.

If installation allows then hard wiring will be provided to connect the satellite dish 50 with the control unit 90, and the control unit with the television monitor 70 and camera unit.

A Signal Control Box (like a cable box) with computer memory, operating, and programming capability may be installed and connected to the television and camera connection. The signal box must have the capability to communicate with a headquarters 10 via satellite 80 upon receiving the proper signal from headquarters 10 at any time of the day. This information could be used for purposes of homeland security, such as looking for evidence of terrorist activity.

The signal box will have the capability to receive and record for viewing at a designated time programming for a minimum of eight (8) hours.

The signal box can be programmed to operate the surveillance camera audio and video and either record or transmit real time activities from the viewing area to headquarters.

The signal box will be capable of receiving television audio and video signals in real time and simultaneously showing them on the television's attached to said vehicle.

6. Operating Description for a Preferred Embodiment Multiple Remote Unit Installation and Operation An embodiment for wiring a multiple-car train, or multiple unit installations for remote locations is described.

Each single remote unit installation may be as previously described, comprising satellite dish, control unit, and television monitor camera and audio recorder with wireless communicating capabilities.

All units may be wired exactly as in the single unit embodiment to facilitate mixing and changing of units at remote locations, on passenger cars in the rail yard, or any other multiple remote unit locations. The multiple remote units may be interconnected among themselves, in either a wired or wireless manner, to enable exchange of information among themselves.

Each control unit will have the capacity to receive signals from headquarters via other control boxes, or through satellite receiving dishes, or via hard wire.

7. Operating Description for a Preferred Embodiment: Headquarters

Referring to FIG. 1, a preferred embodiment of headquarters 10 is described. Within the headquarters 10 there may be monitors 40 with split screen capability to monitor individual units, entire trains, or roll and rotate through the entire vehicle fleet. The number of monitors may be determined by customer. Headquarters 10 may have a satellite dish installation 95. It may also include a master control panel, programmed to communicate individually or collectively with the remote units 30 in one vehicle or the entire fleet of vehicles.

8. Operation of the System with Multiple Remote Units

An embodiment of the operation of the system with multiple remote units is described. At a designated time each day Headquarters will transmit to every remote unit in the fleet up to eight (8) hours or more of pre-recorded programming, such as weather or news. In the case of transportation modalities, at a pre-determined time, programming will commence to play on every television in the system. During the day at any time headquarters may signal the control unit to receive additional current events programming to keep information being disseminated up to date. Pre-recorded programming may be the backup or emergency viewing information when live current information cannot be received by the satellite dish due to dead spots, tunnels, weather conditions, etc.

The video and audio camera inside every television is capable of continuous recording and record retention in the signal box for a substantial period of time—perhaps 24 hours or more—in addition to the ability to transmit live real time images and audio directly to Headquarters upon receipt of the proper coded signal. Remote units can be pre-programmed to transmit signals to headquarters where a bank of monitors can be programmed to sequence from one camera to another for sequential viewing of, for example an entire train, location, or an entire pre-determined system or area.

Television broadcasting from headquarters may be a built-in feature wherein security or safety personnel can broadcast real time information to all passengers for their safety and directions.

Wireless internet users can create a "mobile account" with a secure identity including billing information.

ATM users can deposit and withdraw money or print transit tickets.

Phone users can use a payphone type billing system.

Cellular phone users can dial a number which allows the receiver on the transit vehicle to "carry" the signal to headquarters where the call can be routed.

It is to be understood that the previous descriptions of particular embodiments are not to be construed as limiting. Other embodiments may be conceived by those of ordinary skill in the art, which nevertheless do not lie outside the scope of the invention. The scope of the invention is defined by the following claims

What is claimed is:

1. A transmission and reception system for security and information exchange, said system comprising:
   at least one remote unit located in a public place, and at least one central headquarters,
   said remote unit comprising:
   a first transceiver in two-way electromagnetic communication with said at least one central headquarters,
   at least one concealed surveillance camera, for collecting surveillance information on the activities of persons in the physical neighborhood of said remote unit to be transmitted to said at least one central headquarters, and
   a presentation device capable of presenting audio and video information received from said at least one central headquarters,
   said central headquarters comprising:
   a second transceiver in two-way electromagnetic communication with said at least one remote unit,
   a plurality of audio/video monitors for monitoring said surveillance information collected at and received from said at least one remote unit, and at least one camera for capturing live audio and video information to be transmitted to said at least one remote unit, wherein said central headquarters transmits real time and recorded entertainment, news and advertising information to each of said remote units and simultaneously receives surveillance information on the activities of persons from said remote units.

2. The system of claim 1, wherein said audio and video information comprises information received from said at least one central headquarters in real time.

3. The system of claim 1, wherein said audio and video information comprises information received from said at least one central headquarters and is stored within said remote unit for later playing.

4. The system of claim 1, wherein information is exchanged in both directions between said at least one central headquarters and said at least one remote unit through a first ground-based satellite antenna, said first antenna being in two-way communication with a satellite, said satellite being in two-way communication with a second ground-based antenna.

5. The system of claim 1, wherein said at least one public place is the interior of a public transportation vehicle, a concourse, a tunnel, a building, a railroad right of way, or an area surrounding railroad tracks.

6. The system of claim 1, wherein said central headquarters transmits live emergency instructions from said at least one headquarters.

7. A method for providing security and emergency information, comprising:

providing a transmission and reception system according to claim 1, placing at least one remote unit in each of a plurality of public places, at a central headquarters, monitoring surveillance information on persons collected by said remote units, simultaneously broadcasting from said central headquarters real time or recorded entertainment, news or advertising information to each of said remote units for presentation on said presentation devices, and in response to an emergency situation, interrupting said real time or recorded entertainment, news or advertising information to broadcast live emergency messages from headquarters personnel.

8. The method according to claim 7, wherein said plurality of public places comprise the interior passenger areas of trains, buses, subways, trolleys or taxis.

9. The method according to claim 7, wherein said plurality of public places comprises railway stations, platforms, concourses, tunnels, buildings, sidewalks, railway right-of-way or railway tracks.

10. The method according to claim 7, wherein said live emergency message is broadcast in response to surveillance information obtained from one or more of said remote units.

* * * * *